Patented Oct. 1, 1946

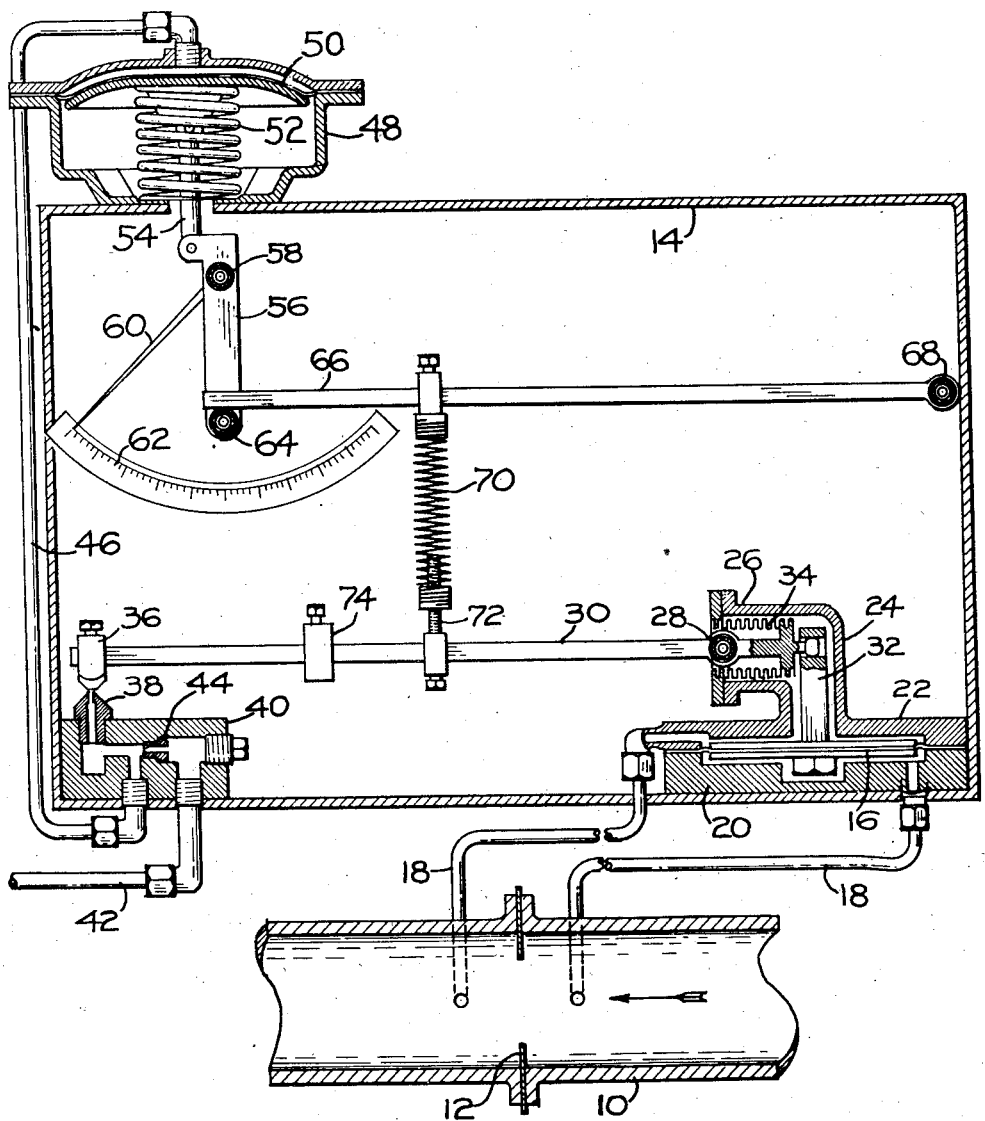

2,408,685

UNITED STATES PATENT OFFICE 2,408,685

PRESSURE RESPONSIVE MEASURING INSTRUMENT

Albert J. Rosenberger, Chicago, Ill., assignor to Republic Flow Meters Company, Chicago, Ill., a corporation of Illinois Continuation of application Serial No. 356,601, September 13, 1940. This application May 31, 1943, Serial No. 489,130

6 Claims. (Cl. 73—407)

This invention relates to sensitive instruments and more particularly to instruments for measuring variations in various physical conditions such as flow of fluid through a conduit.

In sensitive instruments of this type as heretofore used, and particularly in fluid flowmeters, a body of mercury has generally been employed displaced by the action of a pressure or a pressure differential. In some cases the use of mercury is undesirable by reason of its cost, its weight and the bulk of the instrument required to handle it and further because it cannot be used with fluids which have a chemical reaction with mercury. It is accordingly one of the objects of the invention to provide a sensitive instrument in which the use of mercury or like sealing liquid is eliminated.

Another object of the invention is to provide a sensitive instrument which operates purely mechanically and in which a high degree of accuracy can be obtained through an extremely simple construction.

Still another object of the invention is to provide a simple mechanical instrument in which direct indications on a uniformly graduated scale are obtained.

The above and other objects, advantages and novel features of the invention will be apparent from the following description when read in connection with the accompanying drawing, in which the single figure is a diagrammatic view with parts in section of a fluid flowmeter embodying the invention.

The illustrated instrument is adapted to measure and indicate the rate of flow of fluid through a pipe 10 having an orifice plate 12 therein. The instrument is housed in a casing 14 in which is mounted a flexible diaphragm 16 connected on its opposite sides by pipes 18 to the pipe 10 on the opposite sides of the orifice plate 12.

The diaphragm 16 is secured between a bottom housing part 20 secured to the casing 14 and a top hollow housing part 22 having an upwardly extending tubular neck 24 bent at right angles to form a horizontal tubular extension 26. The tubular extension 26 supports adjacent its open end a bearing 28 on which a weigh beam 30 is pivoted with one end projecting into the tubular extension 26.

The diaphragm 16 is connected to the end of the weigh beam 30 by a rod 32 connected to the diaphragm and having a slot or hole in its upper end slidably receiving an enlarged knob on the end of the beam. A flexible seal is provided between the beam and extension 26 by a corrugated flexible tube 34 secured at one end to the open end of the extension and at its opposite end to a flange or collar on the beam within the extension. This construction not only provides a fluid tight seal around the beam but also eliminates friction so that sensitivity of the instrument is not interfered with. The seal and bearing construction are preferably constructed for adjustment in accordance with my Patent No. 2,299,179.

At its opposite end the beam 30 carries a valve member 36 movable toward and away from a bleed orifice 38 carried by a hollow block 40 in the casing. Fluid such as air under pressure is supplied to one end of the block through a pipe 42 and flows through a restriction 44 into a chamber which communicates with the orifice 38 and with a pipe 46. By moving the valve member 36 toward and away from the orifice the pressure in pipe 46 will be varied as is understood in the art.

The pipe 46 communicates with the upper part of a hollow casing 48 divided by a flexible diaphragm 50 which is urged upward by a spring 52. The diaphragm 50 carries a rod 54 pivoted to one end of a lever 56 which is pivoted on a bearing 58. A pointer 60 secured to the lever 56 adjacent the bearing 58 is movable over a scale 62 to indicate the rate of flow.

The lever 56 forms a part of a square root mechanism connecting the diaphragm 50 to the weigh beam and to this end carries a roller 64 engaging the lower side of a lever 66 pivoted on the casing at 68 and lying substantially parallel to the beam 30. Under conditions of no flow the lever 56 lies at right angles to the lever 66 and is swung counterclockwise by the diaphragm 50 when there is flow. The lever 66 and the beam 30 are connected by a tension spring 70 adjustably connected to the beam by a screw 72 and which may, if desired, be pretensioned by a weight 74 on the beam 30.

When fluid is flowing through the pipe 10 a pressure differential is created across the diaphragm 16 tending to raise it and to swing the beam 30 counterclockwise. This moves valve member 36 toward the orifice 38, raising the pressure in the pipe 46 and above the diaphragm 50. The diaphragm 50 is moved down against spring 52 by the pressure increase rocking lever 56 counterclockwise to move the pointer 60 across the scale 62 and to swing the roller 64 to the right and up. The roller raises the left end of lever 66 swinging it about its pivot 68 and tensioning spring 70 an amount sufficient to create a force on the beam balancing the force exerted by the diaphragm 16.

In operation, the roller 64 will move in an arc and will give to the lever 66 a versine movement modified by the angular effect of the lever and the varying distance between the pivot 68 and roller 64. Thus the movement of the lever 56 will approximate the square root of the differential across the diaphragm 16 throughout the operating range. I have found that with a ratio of about 15 to 1 between the lengths of levers 66 and 56 the accuracy over an angular movement of 45° is within three tenths of one percent. Since the spring 70 has a linear characteristic, the movement of the diaphragm 50 will be approximately equal to the square root of the differential across the diaphragm 16 so that the scale 62 can be uniformly calibrated directly in terms of flow through the conduit 10. Also since the motion of the beam 30 is very small and since it is always returned to substantially the same normal position, its control can be effected by a balance of the forces exerted by diaphragm 16 and spring 70 and its change of position will not affect the accuracy of the square root mechanism so that no carefully shaped positioning cams are required and inaccuracies due to mechanical imperfections are minimized.

It will be understood that by varying the proportions and relative angles and lengths of the linkage slightly functions other than the square root of the controlling force could be used. Also while the invention has been shown and described in connection with a flowmeter it can equally well be used in the measurement of other conditions and the particular instrument illustrated is not intended as a definition of the scope of the invention, reference being had for this purpose to the appended claims.

This application is a continuation of my copending application Serial No. 356,601 filed September 13, 1940.

What is claimed is:

1. A sensitive instrument comprising a pivoted beam, means responsive to a condition to be measured for creating a force acting on the beam to swing it in one direction, a pressure control device operated by movement of the beam for producing a pressure variable with movement of the beam, power means operated by the pressure and movable in response to variations therein, a pivoted lever lying substantially parallel to the beam, a spring connecting the beam and lever, a pivoted arm lying substantially at right angles to the beam and lever and connected to the power means to be moved thereby, and a roller carried by the free end of the arm and slidably engaging the lever adjacent its free end to move the lever an amount substantially proportional to the square of the movement of the arm.

2. In a sensitive instrument including a pivoted control beam, a square root mechanism comprising a pivoted lever lying substantially parallel to the beam, a tension spring connecting the lever and beam, a pivoted arm normally lying substantially at a right angle to the lever, means to move the arm in a direction to move its free end toward the pivot of the lever, and a roller carried by the free end of the arm and engaging the lever adjacent its free end to move the lever an amount substantially equal to the square of the movement of the arm.

3. A pressure sensitive instrument comprising a pivoted beam, means responsive to a condition to be measured for creating a force acting on the beam to urge it in one direction, a pressure control device operated by the beam for producing a pressure variable with movement of the beam, a fluid motor connected to the control device to move in response to variations in the pressure, a pivoted arm connected to the motor to be moved about its pivot by the motor, a pivoted lever normally lying substantially at a right angle to the arm with a substantially straight portion thereof adjacent its free end, means on the arm at a point adjacent the free end of the arm slidably to engage the straight portion of the lever and move it an amount proportional to displacement of said point in a direction at right angles to the lever as the arm is moved, and a spring connecting the lever to the beam to balance the force of the first named means acting on the beam.

4. A pressure sensitive instrument comprising a pivoted beam, means responsive to a condition to be measured for creating a force acting on the beam to urge it in one direction, a pressure control device operated by the beam for producing a pressure variable with movement of the beam, a fluid motor connected to the control device to move in response to variations in the pressure, a pivoted arm connected to the motor to be moved about its pivot by the motor, a lever pivoted at one end and lying substantially parallel to the beam, means on the arm adjacent the free end of the arm slidably engaging a substantially straight surface of the lever adjacent the free end of the lever to move it about its pivot directly by the arm an amount proportional to displacement of said last named means in a direction at right angles to the lever toward and away from the beam as the arm is moved by the motor, and a tension spring connecting the lever and the beam.

5. A pressure sensitive instrument comprising a pivoted beam, means responsive to a condition to be measured for creating a force acting on the beam to urge it in one direction, a pressure control device operated by the beam for producing a pressure variable with movement of the beam, a fluid motor connected to the control device to move in response to variations in the pressure, a pivoted arm connected to the motor to be moved about its pivot, by the motor, a lever pivoted at one end and lying substantially parallel to the beam, the arm normally lying substantially at a right angle to the lever with a point adjacent its free end engaging a substantially straight surface of the lever adjacent the free end of the lever and movable toward the lever pivot upon an increase in pressure supplied to the motor to move the lever about its pivot an amount proportional to displacement of said point at right angles to the lever modified by the variation in effective length of the lever, and a tension spring connecting the lever to the beam.

6. In a sensitive instrument including a pivoted control beam, a square root mechanism comprising a pivoted lever lying substantially parallel to the beam, a tension spring connecting the lever and beam, a pivoted arm normally lying substantially at a right angle to the lever with a point adjacent its free end engaging a substantially straight surface of the lever adjacent the free end of the lever to move the lever about its pivot an amount proportional to displacement of said point at right angles to the lever modified by the variation in effective length of the lever, and means to move the arm about its pivot whereby the arm will move the lever an amount substantially equal to the square of the movement of the arm.

ALBERT J. ROSENBERGER.